June 9, 1936. L. M. BROWDER 2,043,880
BATTERY CUT-OUT AND SAFETY LOCK
Filed March 11, 1935 3 Sheets-Sheet 2

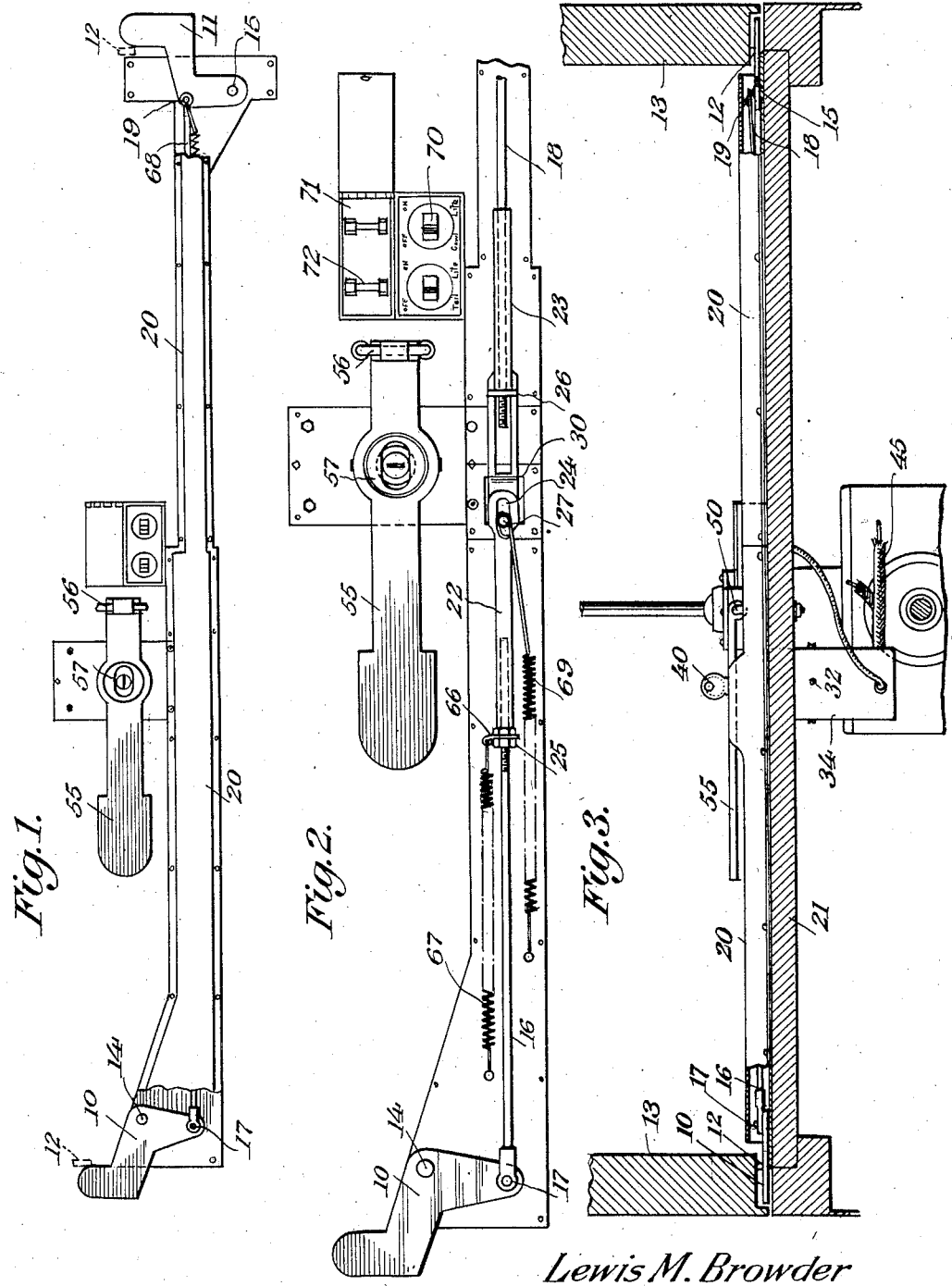

Lewis M. Browder
INVENTOR
BY Victor J. Evans & Co.
ATTORNEYS

June 9, 1936. L. M. BROWDER 2,043,880
BATTERY CUT-OUT AND SAFETY LOCK
Filed March 11, 1935 3 Sheets-Sheet 3
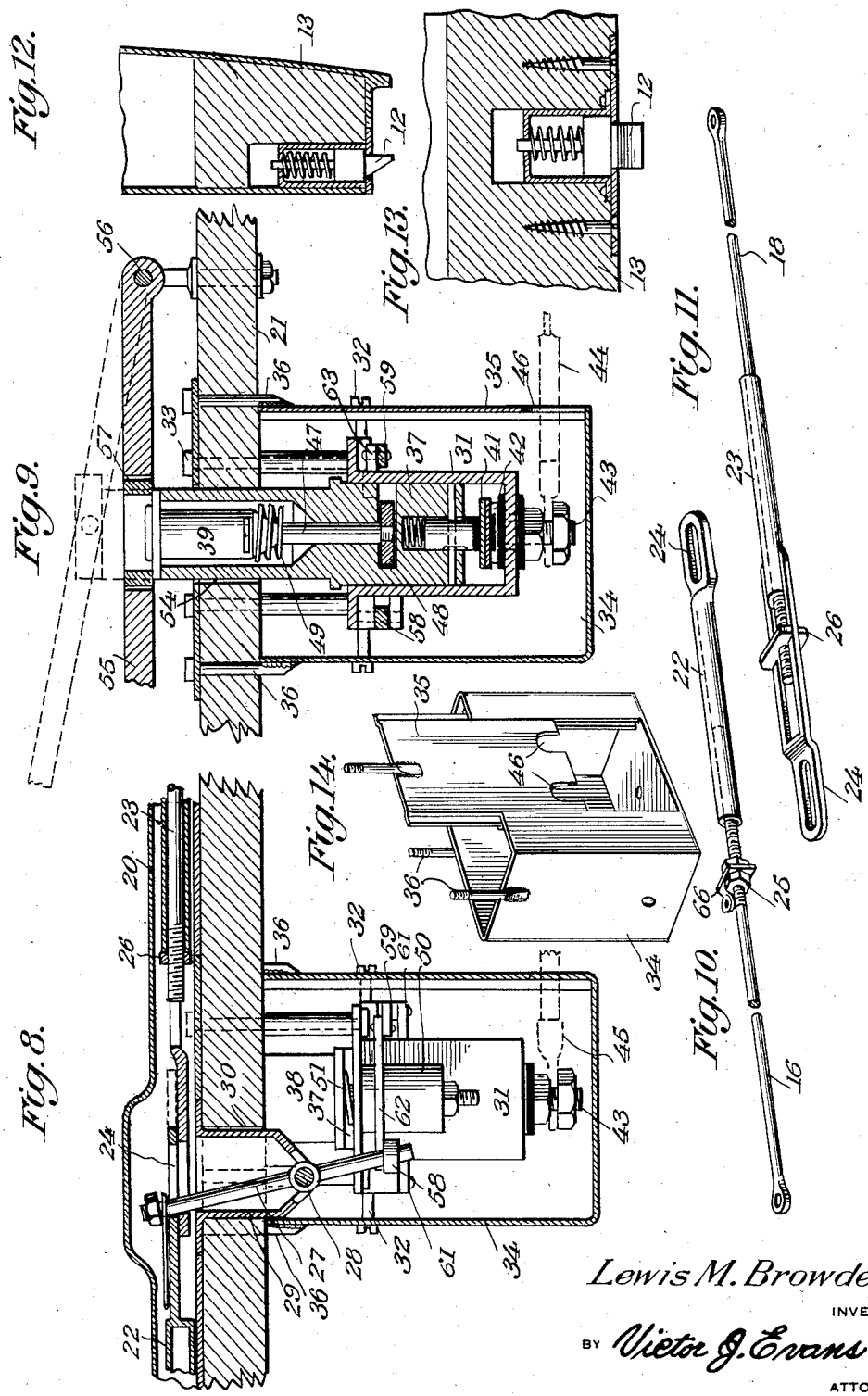
Lewis M. Browder
INVENTOR
BY Victor J. Evans & Co.
ATTORNEYS Patented June 9, 1936

2,043,880

UNITED STATES PATENT OFFICE 2,043,880

BATTERY CUT OUT AND SAFETY LOCK

Lewis M. Browder, East Columbus, Ohio

Application March 11, 1935, Serial No. 10,571

2 Claims. (Cl. 200—44)

The invention relates to a safety switch for use in the electric system of automobiles and more especially to a battery cut out and safety lock.

The primary object of the invention is the provision of a device of this character, wherein a battery can be cut off from the electric ignition system as installed within an automobile so as to eliminate theft of the same or conflagration as often occurs, the device being under control of the doors of the body of the automobile so that should a person controlling the operation of the vehicle neglect to shut off the ignition and leave the vehicle on the opening of either door for an exit from the vehicle the ignition circuit will be opened and the battery cut off from such circuit.

Another object of the invention is the provision of a device of this character, wherein the ignition circuit may be closed through the use of a key operated lock and such circuit automatically opened when either door of the body of the vehicle is swung to open position, this being required when an exit by a person is made from the vehicle so that there is no liability of the ignition circuit including the starter circuit remaining closed when an operator of the said vehicle has left the same and also prevents the running of the motor when the vehicle is vacated by the operator as the ignition circuit becomes open.

A further object of the invention is the provision of a device of this character, wherein the same is readily applicable to different types of motor vehicles and avoids the necessity of any material change in the circuit arrangement of the electric system for such vehicle and affords a safety device against fire and theft, the ignition circuit being susceptible of closing through the use as is conventional of a key actuated lock and the said circuit being automatically opened for safety purposes.

A still further object of the invention is the provision of a device of this character, which is comparatively simple in its construction, thoroughly reliable and efficient in its operation, compact, readily and easily mounted in a motor vehicle, strong, durable, and inexpensive to manufacture and install.

With these and other objects in view, the invention consists in the features of construction, combination and arrangement of parts as will be hereinafter more fully described and illustrated in the accompanying drawings, which disclose the preferred embodiment of the invention, and pointed out in the claims hereunto appended.

In the accompanying drawings:

Figure 1 is a plan view of the device constructed in accordance with the invention, parts thereof being broken away for clarity of certain details.

Figure 2 is a fragmentary plan view similar to Figure 1 on an enlarged scale and certain portions of the device being broken away.

Figure 3 is a fragmentary vertical transverse sectional view through a vehicle body showing the device installed in the vehicle to identify the relative positions of the parts of the vehicle and the device.

Figure 8 is a fragmentary vertical sectional view showing the switch closed and the relative positions of adjuncts.

Figure 9 is a vertical transverse sectional view through the parts shown in Figure 8 and showing by full lines the switch closed and the actuated lever in lowered position while by dotted lines is shown the position of the lever when the switch is open.

Figure 10 is a perspective view of one of the door controls.

Figure 11 is a perspective view of the other door control.

Figure 12 is a fragmentary vertical transverse sectional view through one of the vehicle doors showing the latch carried thereby.

Figure 13 is a fragmentary vertical sectional view through the door taken at right angles to the section shown in Figure 12.

Figure 14 is a perspective view of the housing for the switch and a slide section thereof partially opened.

Similar reference characters indicate corresponding parts throughout the several views in the drawings.

Figure 5:
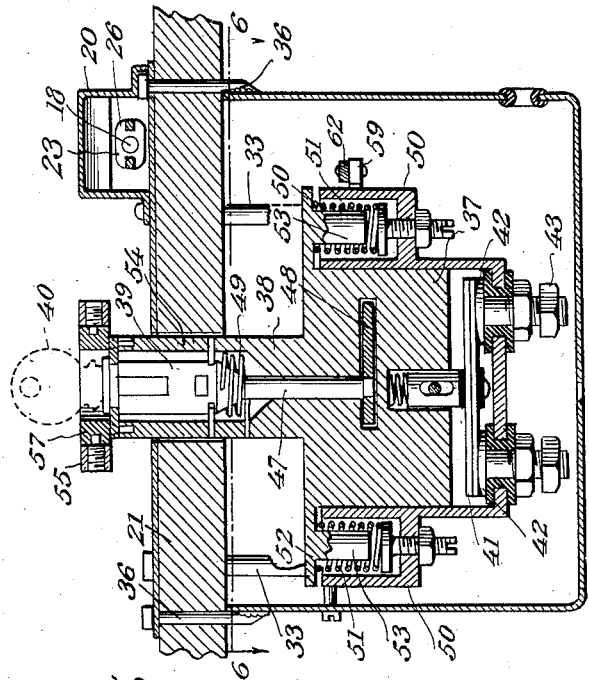
Figure 5 is a view similar to Figure 4 excepting that the switch is shown in section and in closed positions.
Figure 7:
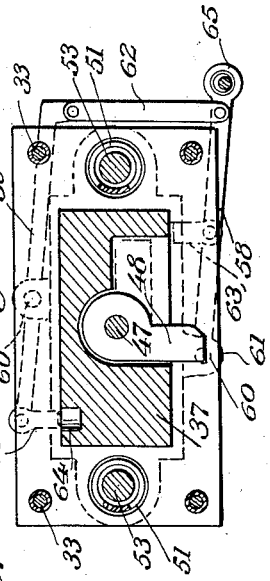
Figure 7 is a fragmentary horizontal sectional view showing the switch in open position and locked in that position.
Figure 4:
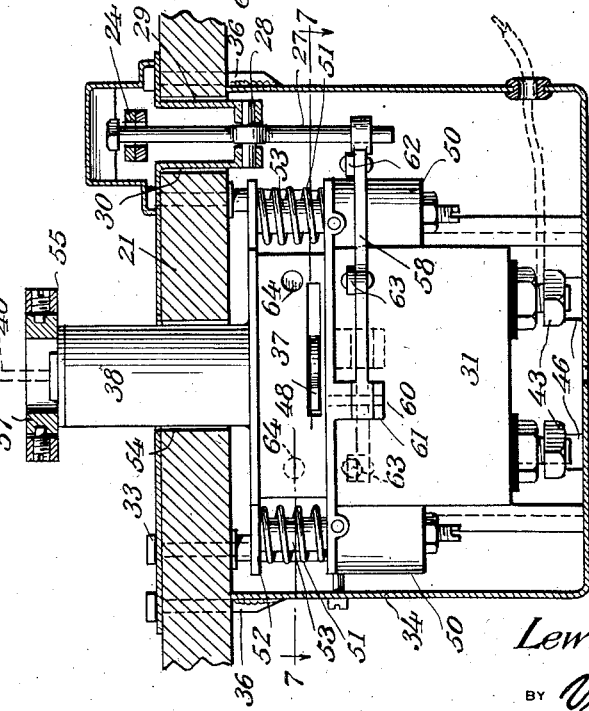
Figure 4 is a fragmentary vertical sectional view showing the switch of the device in normally open position.
Figure 6:
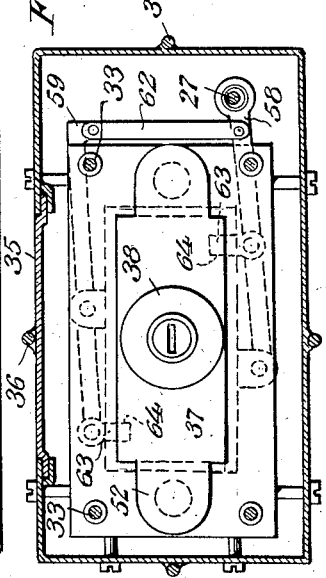
Figure 6 is a top plan view.

Referring to the drawings in detail, the device comprises a pair of releasing dogs 10 and 11, respectively, normally engaged by spring tension latches 12, these being fitted in doors 13 at opposite sides of the body of a motor vehicle of standard construction, the doors being swung horizontally to opening and closing positions for entry and exit to and from the vehicle as is usual.

The dog 10 is pivoted at 14 while the dog 11 is pivoted at 15 to the frame work for the respective doors. A push rod 16 is pivoted at 17 to the dog 10 while a pull rod 18 is pivoted at 19 to the dog 11. These rods extend toward each other and are concealed within a conduit 20 fitted to a floor 21 as built within the motor vehicle. The ends of the rods 16 and 18 next to each other or the inner ends of the same have fitted therewith loose play tubular parts 22 and 23, respectively, these having the elongated eye ends 24 adapted to overlap each other. The rods carry the adjustable stops 25 and 26, respectively, to coact with the tubular parts 22 and 23 so that a positive push and a positive pull may be had by said rods 16 and 18 after a predetermined play of the parts 22 and 23 has taken place, the purpose of the play being to allow either door to swing without disturbing the parts connected with the other door or a retarding action being set up thereby in the working of one rod with respect to the other rod.

Passed through the eyes 24 is the upper end of a rocking arm 27 pivoted at 28 in a hanger 29 formed on and depending from the conduit 20 through a suitable clearance 30 in the floor 21 and this arm 27 operates a latching means for a switch for holding the latter closed, the latching means and the switch being hereinafter fully described.

The switch which is adapted to be arranged in the electric wiring system installed within an automobile including the ignition and starter circuits for shutting off a battery, not shown, or opening such system comprises a switch box 31 made from sheet metal and having a suitably insulated bottom and fixedly held by fasteners 32 and 33, respectively, within a housing 34 and spaced below the floor 21 the required distance, the housing 34 being provided with a door section 35 slidably fitted therewith. The housing 34 and the door section carry hanger bolts 36, these being anchored in the floor 21, the sliding door section 35 fitted with the housing 34 being for convenience in the assembling of the switch parts within said housing and the placement thereof beneath the floor 21. The fasteners 32 are engaged with the housing 34 including its section 35 while the fasteners 33 are engaged with the floor 21. Slidably fitted in the box 31 is a movable switch block 37 made from insulating material and formed with a vertical tubular column forming a depressible stem 38 providing a casing for a locking cylinder 39 of the key actuated tumbler type, the cylinder 39 being turned when the key 40 therefor is inserted therein as the tumblers within the cylinder 39 will be moved to released position upon the insertion of said key. The block yieldably supports a switch 41 for engaging terminal contacts 42 of binder posts 43 for circuit wires 44 and 45, respectively, of the electric system installation within the motor vehicle to close the circuit for ignition purposes. The box of the switch 41 is preferably made from sheet metal having a suitably insulated base. When the switch 41 engages the contacts 42 it is in circuit closing position and when said switch 41 is disengaged from the contacts 42 the same is in circuit opening position and the battery, not shown, cut off.

The door section 35 of the housing 34 is provided with the openings 46 for the wires 44 and 45 so that the same may lead into the said housing and be engaged on the posts 43.

The cylinder 39 is formed with a shaft 47 suitably fitting in the block 37 and has thereon a swinging latch 48 the latter being adapted to engage with the top of the box 31 to hold the switch 41 out of engagement with the contacts 42 or in open position when the block is elevated. The cylinder 39 is turned clockwise by the action of a coiled spring 49 about the shaft 47 to bring the latch 48 into locking position at the top of the box 31 with the switch 41 open and such cylinder 39 is turned counterclockwise by the key 40 for the unlocking of the latch 48 to permit the switch 41 to be moved to circuit closing position.

Formed on the box 31 are spring barrels 50, these being located beyond opposite ends of said housing and have adjustably arranged therein coiled tensioning springs 51 working against extensions 52 of the block 37 and about centering lugs 53 on said extensions, the purpose of the springs 51 being to raise the block 37 for the opening of the switch 41 and the locking or latching of said block by the latch 48 in its raised position within the box 31. In this raised position of the block 37 the stem 38, constituting the shell or casing for the cylinder 39, is protruded through a clearance 54 in the floor 21 slightly above the same and overhanging this stem 38 is a foot pedal 55 pivoted for vertical swinging movement in a bearing 56 fixed in the floor 21, the said foot pedal 55 being fitted with a self-adjusting pivotal striker 57 for the stem 38. It will be seen that by depressing the foot pedal 55 which has its striker 57 playing directly on to the stem 38 of the block 37 the latter will be lowered in the box 31 to bring the switch 41 into closing position and in engagement with the contacts 42 thus closing the electrical system including the ignition and starter circuits. It is, of course, understood that before the block 37 may be lowered it is necessary that the cylinder 39 of the lock be turned to release the said block 37 by disengaging the latch 48 from the top of the box 31.

The latching means for the switch as operated by the arm 27 comprises a pair of levers 58 and 59, respectively, these being arranged at opposite sides of the box 31 and pivoted at 60 in bearings 61 provided on said box, they being pivotally joined by a link connection 62 and carrying locking bolts 63 engageable in keeper notches 64 provided in the block 37 to hold the latter lowered within said box 31 and the switch 41 closed and engaging the contacts 42. The lever 58 carries an eye 65 engaged by the arm 27 so that this arm when pushed by the rod 16 or pulled by the rod 18 will release the bolts 63 from the block and the switch will move to open position. The stop 25 on the rod 16 connects a clip 66 therewith and this clip has engaged with the same a coiled retractile spring 67 which is secured to the conduit 20, while connected with the pivot 19 of the rod 18 is a coiled retractile spring 68 it being also attached to the conduit 20, and the purpose of these springs 67 and 68 is to return the dogs 10 and 11 to normal position as shown in Figures 1 and 2 of the drawings after being tripped or moved to releasing position by the latches 12 on the doors 13.

The arm 27 has connected thereto a coiled retractile spring 69 which is attached to the conduit 20 and this spring functions to urge bolts 63 in latching direction for the automatic engagement with the keeper sockets 64 in the block 37 when the same is lowered in the box 31 and thus lock the switch 41 in closing position until the block 37 is automatically released by the dogs 10 and 11 engaged by the latches 12 on the doors 13 on the opening of either of the same.

In the electrical system of installation within the automobile is included in its light circuit the tail and cowl light hand switches 70 and adjacent thereto is a fuse box 71 for fuses 72 as employed in the electrical system.

In the operation of the device normally the switch 41 is open or in circuit open position and the block 37 raised in the box 31 with the latch 48 engaging the top of the said box to hold the said block raised or the switch open, it being also understood that the doors 13 are closed and the latches 12 engaged with the dogs 10 and 11 as will appear in Figure 1 of the drawings. To close the switch 41, the operator within the automobile engages the key 40 in the cylinder 39 and by turning the cylinder releases the latch 48, whereupon by depressing the foot pedal 55 the block 37 is lowered in the box 31 to bring the switch 41 to a closing position by engaging the contacts 42. Under the action of the spring 69 the locking bolts 63 will engage the keeper notches 64 in the block locking the latter in the lowered position within the box 31 to hold the switch closed. Now, should the operator fail to effect the opening of the switch 41 upon exit from the vehicle by opening either door 13, the swinging thereof to open position will cause the arm 27 to be operated and thus the bolts 63 will be thrown to releasing position or disengaged from the keeper notches, whereupon the block 37 under the action of the springs 51 will elevate for the opening of the switch 41, disengaging it from the contacts 42 and thus cutting off the battery or opening the electric system, and said block 37 in this elevated or raised position will become latched under the action of the spring 49 turning the cylinder 39 of the lock bringing the latch 48 into latching position with the top of the box 31 and thereby opening the electrical system, so that the motor of the vehicle can not operate and in this fashion serving as safety against fire or theft. It is impossible to close the switch 41 until the latch 48 has been released by the use of the key 40 in the lock cylinder 39. Now, it should be seen from the foregoing that should an operator neglect to turn off the ignition circuit of the system installed within the vehicle and vacate the latter by opening either door 13 the ignition circuit will be opened automatically as the switch 41 will move to open position and cut off the battery from the electric system.

What is claimed is:

1. The combination with an electric system installation in a motor vehicle, of a switch in said system, operating means for closing said switch, key operated means for locking the switch open, means for locking the switch closed, and means operated by a door of the vehicle for actuating the last-named means to release the same and permit the opening of the switch.

2. The combination of means for moving an electric switch to a position for closing an electric circuit, key operated means for locking the switch open, means for locking the switch when closing the electric circuit, and means for mounting on a door and having elements cooperating with each other and coactive with the last-named means for the release of the same.

LEWIS M. BROWDER.